Figure 1:
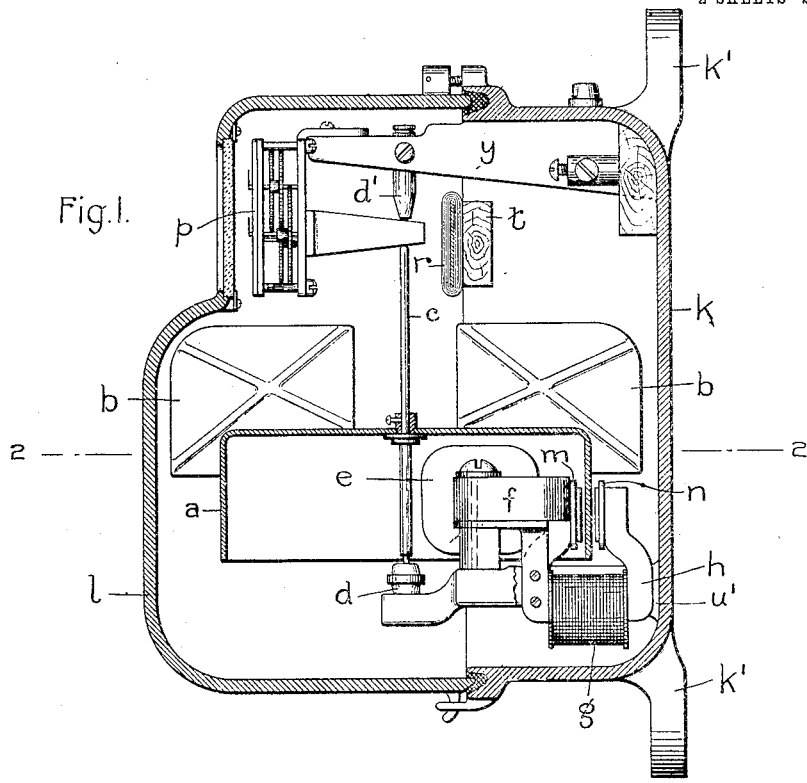

No. 800,375. PATENTED SEPT. 26, 1905.
E. J. KING.
LOAD METER.
APPLICATION FILED SEPT. 6, 1902.

2 SHEETS—SHEET 1.

Witnesses.
Marcus L. Byng.
Benjamin B. Hull.

Inventor:
Elton J. King.
by Albert G. Davis
Atty.

No. 800,375. PATENTED SEPT. 26, 1905.
E. J. KING.
LOAD METER.
APPLICATION FILED SEPT. 6, 1902.

2 SHEETS—SHEET 2.

Witnesses.
Marcus L. Byng.
Benjamin B. Hull

Inventor.
Elton J. King.
by Albert G. Davis
Atty.

UNITED STATES PATENT OFFICE.

ELTON J. KING, OF FORT WAYNE, INDIANA, ASSIGNOR TO GENERAL ELECTRIC COMPANY, A CORPORATION OF NEW YORK.

LOAD-METER.

No. 800,375.  Specification of Letters Patent.  Patented Sept. 26, 1905.

Application filed September 6, 1902. Serial No. 122,358.

*To all whom it may concern:*

Be it known that I, ELTON J. KING, a citizen of the United States, residing at Fort Wayne, county of Allen, State of Indiana, have invented certain new and useful Improvements in Load-Meters, of which the following is a specification.

My invention relates to improved means for the production of a rotary field in alternating-current apparatus.

My invention relates more specifically to improvements in alternating-current meters of the "ampere-hour" class, commonly known as "load-meters," and is especially applicable to meters used for measuring small loads—such, for instance, as the current supplied to small consumers in office buildings and the like; but it is not necessarily limited to such use.

A further application of my invention is to motors of the alternating-current or induction type using a rotary field and in which a means for varying the speed is desirable.

My invention consists of an alternating-current meter or motor having a resistance, preferably non-inductive, inserted in series with the ordinary main or series winding of said meter or motor and an auxiliary winding shunted around more or less of said resistance, said main and auxiliary windings being carried by independent cores of magnetic material mounted in inductive relation to the rotating part, which part is made of conductive material. Closed or short-circuited secondary coils or rings, now well known in the art, are mounted on the same core which carries the auxiliary winding and and are therefore in inductive relation to said winding. The main and auxiliary windings might be mere solenoids, and the short-circuited secondary windings might be omitted without affecting the operation of the device or departing from the spirit of the present invention. By varying the amount of resistance between the terminals of the shunt the excitation of the auxiliary winding, and consequently the speed of the meter, can be varied without changing the phase relation of the main and auxiliary windings. This affords, therefore, a convenient mode of calibrating the instrument for speed. It has been customary heretofore to obtain the speed adjustment merely by the drag or retardation device employed and not by the variation of the excitation of the auxiliary circuit.

It has been customary in the construction of alternating-current meters or motors to arrange the main or primary and auxiliary or secondary windings and mount the same relative to the armature, so that a ninety-degree relative phase displacement will be obtained in the two windings and the magnetic fields so produced will act upon the armature to produce the maximum torque. The use of the closed or short-circuited secondary coils in the prior art has been for the purpose of more nearly attaining this ninety-degree phase displacement. It is not my particular object to obtain a ninety-degree phase displacement, as any reasonable angle will make the device operate; but whatever the phase relation may be my invention enables me to retain it practically constant and yet obtain a large range of speed adjustments. It will be noted that the short-circuited secondary coils, as shown, are not adjustable; but they could be made so if it were desirable to change the phase displacement. A particular phase relationship is not necessary for the production of an operative device for the purpose described in the design of meters or motors of this type. It is furthermore possible with a meter embodying my invention, assuming the potential of the circuit to remain constant, to so calibrate said meter that it will register in watt-hours.

My invention will be more clearly understood from the following description of the accompanying drawings, of which—

Figure 2:
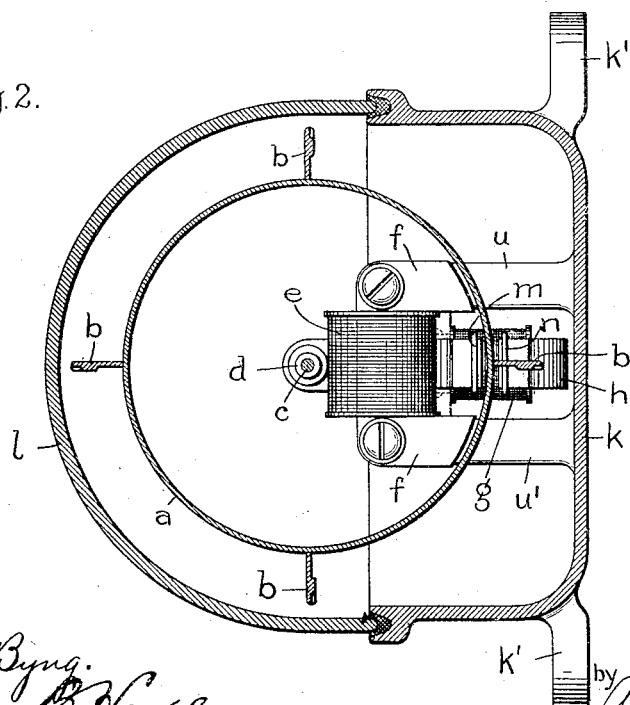
Figure 3:
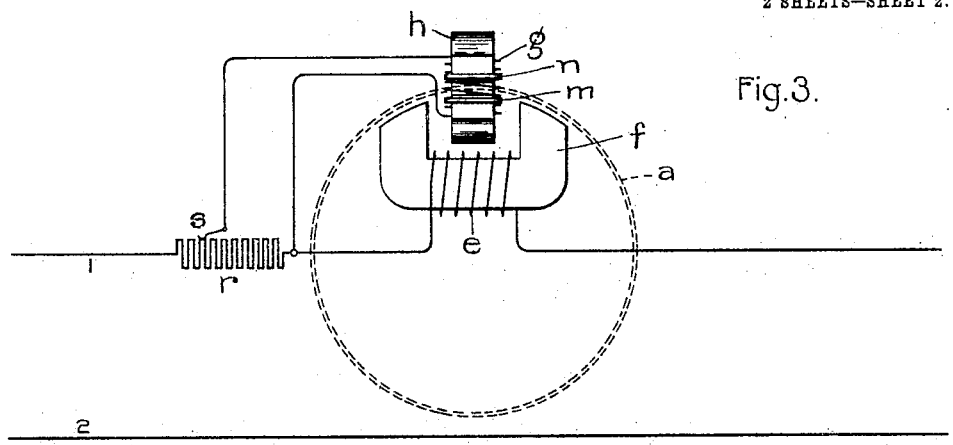
Figure 4:
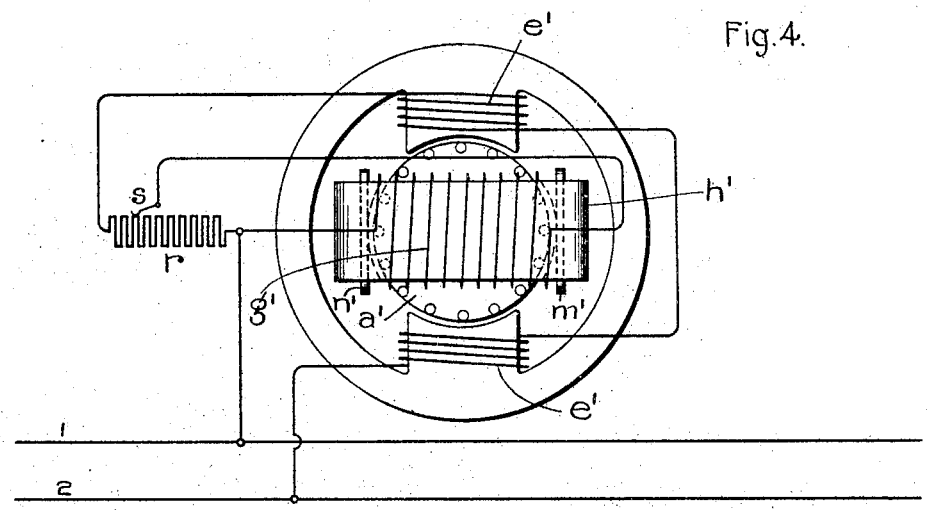

Figure 1 represents an elevation, partly in section, of a meter which embodies my invention. Fig. 2 is a horizontal section on the line 2 2 of Fig. 1. Fig. 3 is a diagrammatic representation of the meter shown in Figs. 1 and 2 and the connections therefor. Fig. 4 represents, diagrammatically, my invention as applied to a motor where variable speed is desired; and Fig. 5 is a view in partial cross-section of the said motor of Fig. 4.

Referring now to Figs. 1, 2, and 3, $a$ represents an armature or rotatable member, preferably of a cup shape, mounted on the shaft $c$ and carrying the air-vanes $b$ to provide the necessary drag to the instrument. This armature may be constructed of aluminium or any other suitable metal. The shaft $c$ operates in the bearings $d$ and $d'$, preferably jeweled, which bearings are supported by the lugs $u$, $u'$, and $y$, attached to the casing $k$, which may be fastened to a house wall or panel by means of the lugs $k'$. The lug $y$ also carries the registering mechanism $p$ of the usual construction. The casing $k$ is closed by the removable cover $l$. The main or series coil is represented by $e$ and is connected in series on one side of the line. The coil $e$ is wound on a laminated iron core $f$ of a construction clearly shown in Figs. 2 and 3. The iron core $f$ is so formed as to direct the field or magnetic flux produced by the coil $e$ through walls of the armature $a$. In series with the main coil $e$ is placed the non-inductive resistance $r$, which may be supported within the casing $k$ by means of the insulated strips $t$ or any other suitable means. The winding $g$, which is carried upon the laminated iron core $h$, of the form shown in Fig. 1, is shunted across the resistance $r$ and connected in such a manner, through the agency of the sliding contact $s$ or any other equivalent mechanism, that more or less of the resistance $r$ may be shunted by $g$. The core $h$ is so constructed and so supported in the casing by the lugs $u$ and $u'$ that the magnetic flux produced by the coil $g$ is directed through the walls of the armature $a$. Over the ends or poles of the laminated iron core $h$ are placed the closed coils or rings $m$ and $n$, which constitute the secondary windings of the instrument. By shunting the auxiliary winding $g$ over more or less of the resistance $r$ I am enabled to provide a method of exciting the said auxiliary windings and the secondaries $m$ and $n$ to any intensity desired within reasonable limits, and also a means whereby the speed of the meter may be adjusted as desired for the purposes of calibration.

Figure 5:
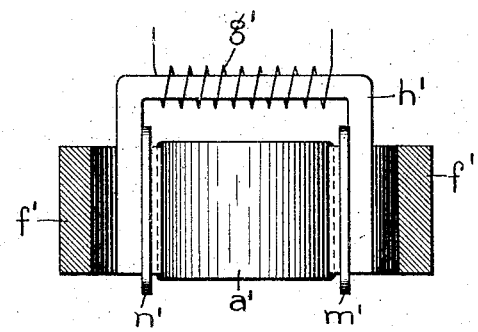

In Figs. 4 and 5 I have shown one form of motor in which my invention may be incorporated. This motor has the now well-known type of squirrel-cage armature $a'$. The closed secondaries $m'$ and $n'$ are mounted on the laminated core $h'$, built of punchings of the form shown in Fig. 5. The core $h'$ also carries the winding $g'$, which is therefore in inductive relation to the secondaries $m'$ and $n'$ and also to the armature $a'$ and is shunted across the resistance $r$, the amount of the resistance shunted being varied as desired to vary the speed of the armature $a'$. The main series coils $e'$ are carried by the frame or core $f'$, which is built up of punchings of the form shown in Fig. 4. These Figs. 4 and 5 show the application of my invention to a two-pole motor, and the secondaries are so mounted as to produce a field at right angles to the direction of the field produced by the main or series windings; but it is readily seen that by suitable modification of the structure the invention could be applied to a multipolar machine as well.

I have also shown the resistance $r$ connected in series with the main field-windings, which are shunted across the mains 1 and 2. The resistance $r$ has been described as preferably non-inductive, as in this form it will permit of a construction that will allow convenient adjustment, the entire object of said resistance and adjustable shunt being to provide a means of exciting the auxiliary winding and short-circuited secondary windings to any intensity desired in order to vary the speed of the meter or motor.

I do not intend to imply that any of the improvements above referred to are limited in their application to use in connection with the specific structures herein illustrated, since other devices employing multiphase currents and embodying my improvements can be operated successfully in other and different relations. Such useful applications or embodiments will be obvious to those skilled in the art.

What I claim as new, and desire to secure by Letters Patent of the United States, is—

1. In an alternating-current meter, a winding included in the main circuit in which the current to be measured is flowing, a resistance in series with said winding, an auxiliary winding in shunt to said resistance and arranged in non-inductive relation to the main winding, and a secondary member of conductive material in inductive relation to said main and auxiliary windings.

2. In an alternating-current meter, a main winding included in the main circuit, an adjustable resistance in series with said winding, an auxiliary winding shunted around said adjustable resistance and arranged in non-inductive relation to the main winding, and a rotative secondary member of conductive material in inductive relation to said main and auxiliary windings.

3. In an alternating-current meter, a winding included in the main circuit, a resistance in series with said winding, an auxiliary winding shunted around the whole or a part of said resistance and arranged in non-inductive relation to the main winding, and a rotative secondary member of conductive material in inductive relation to said main and auxiliary windings.

4. In an alternating-current meter, a winding included in the main circuit, a resistance in series with said winding, an auxiliary winding shunted around the whole or a part of said resistance and arranged in non-inductive relation to the main winding, short-circuited secondary windings in inductive relation to said auxiliary winding, and a rotative secondary member of conductive material in inductive relation to said main and auxiliary windings.

5. In an alternating-current meter, a main winding included in the main circuit, and mounted on a laminated core of magnetic material, a resistance in series with said main winding, an auxiliary winding mounted on a laminated core of magnetic material, and in shunt to said resistance and arranged in non-inductive relation to the main winding, and a rotative secondary member of conductive material in inductive relation to said main and auxiliary windings.

6. In an alternating-current meter, a main winding included in the main circuit, a core of magnetic material on which said winding is mounted, an adjustable resistance in series with said main winding, an auxiliary winding in shunt to said resistance and arranged in non-inductive relation to the main winding, short-circuited windings, a core of magnetic material on which said auxiliary winding and said short-circuited windings are mounted, and a rotatable secondary member of conductive material in inductive relation to said main and auxiliary windings.

7. In combination, a main coil or coils included in a circuit in which an alternating current is flowing, a resistance in series with said coil or coils, an auxiliary coil shunted around the whole or a part of said resistance and arranged in non-inductive relation to the main winding, and a rotative secondary member of conductive material in inductive relation to said main and auxiliary coils.

8. In combination, a main winding included in a circuit in which an alternating current is flowing, a resistance in series with said winding, an auxiliary winding in shunt with the whole or a part of said resistance and arranged in non-inductive relation to the main winding, short-circuited secondary windings in inductive relation to said auxiliary winding, and a rotative secondary member of conductive material in inductive relation to said main and auxiliary windings.

In witness whereof I have hereunto set my hand this 2d day of September, 1902.

ELTON J. KING.

Witnesses:
R. F. HARDING,
H. P. BROUGHTON.